Patented July 22, 1952

2,604,457

UNITED STATES PATENT OFFICE 2,604,457

STYRENE-ACRYLIC ACID COPOLYMERS REACTED WITH POLYMERIC 4-VINYLCYCLOHEXENE DIEPOXIDE

Gordon Hart Segall and John Francis Clemow Dixon, McMasterville, Quebec, Canada, assignors to Canadian Industries Limited, Montreal, Quebec, Canada, a corporation of Canada No Drawing. Application May 31, 1951, Serial No. 229,292. In Canada March 3, 1949

5 Claims. (Cl. 260—45.5)

This invention relates to new polymeric materials and to a method of making the same. More particularly, it relates to thermoset, infusible, solvent insoluble polymers of styrene having an intermediate thermoplastic, fusible, solvent soluble stage, and to a method of making the same.

This application is a continuation-in-part of our application Serial No. 132,204 filed on December 9, 1949, now abandoned.

It has heretofore been the practice to prepare thermoset, infusible, solvent insoluble polymeric materials from styrene by copolymerizing styrene with divinyl benzene. However, due to the identical activity of the vinyl bonds in the divinyl benzene, it has been impossible to obtain a thermoplastic, fusible, solvent soluble product at any stage of the copolymerization except at very low conversions. Cross-linking occurs simultaneously with linear polymerization and the end product is highly cross-linked and hence thermoset, infusible and solvent insoluble.

The production of protective coatings based on thermoset, infusible, solvent insoluble polymeric materials, for example, preferably requires that a thermoplastic, fusible, solvent soluble product be formed at an intermediate stage of the polymerization reaction. The thermoplastic product may thus be homogeneously and uniformly applied to the articles to be coated, and thereafter infusibilized and insolubilized by baking.

If, instead of divinyl benzene, a vinyl monomer containing a less active double bond, e. g. a vinyl-allyl compound, is copolymerized with styrene, it is possible, by careful control of polymerization conditions, to obtain a linear thermoplastic styrene copolymer which subsequently can be infusibilized and insolubilized by cross-linking through the allyl group. However, since an allyl group differs from a vinyl group only in the degree with which it polymerizes, it is difficult to exclude the possibility of cross-linking during the initial polymerization. Accordingly, the range of polymerization conditions is seriously limited and there is a constant danger of gelation with loss of the polymer charge.

It has now been found that, if styrene is copolymerized with a certain minor amount of an acrylic acid and a certain minor amount of at least one other polymerizable ethylenically unsaturated compound having the ethylenic group as sole reactive group and the resultant copolymer is heated with linear polymeric 4-vinylcyclohexene diepoxide under the conditions hereinafter specified, the above difficulties are completely overcome. There is first obtained a thermoplastic, fusible, solvent soluble copolymer which is substantially free of any cross-linkage and which becomes thermoset, infusible, solvent insoluble by cross-linking through its free carboxylic acid groups only upon reaction with the polymeric 4-vinylcyclohexene diepoxide. Any polymerization conditions can thus be employed for preparing the thermoplastic copolymer and there is absolutely no danger of gelation occurring during the initial polymerization.

In United States Patents Nos. 2,375,960 and 2,421,876 and German Patent No. 544,326, it has been proposed to copolymerize styrene with an unsaturated anhydride, such as maleic anhydride, and to infusibilize and insolubilize the resultant thermoplastic copolymer by reaction with a polyhydroxy compound, such as a glycol or glycerol. In such instances, free carboxylic acid groups are formed as a result of the cross-linking reaction, which results in alkali sensitivity of the thermoset polymers, whereas in the process of the present invention, free hydroxyl groups are produced which do not affect the alkali resistance of the polymers. Furthermore, it is difficult to produce copolymers containing maleic anhydride or other unsaturated anhydride which have a wide range of composition because of the tendency of these materials to polymerize in constant proportions with other monomers. This difficulty is not encountered in the process of this invention.

French Patent No. 881,981 shows the reaction between polyepoxides and polymeric materials containing free carboxylic acid groups with resultant cross-linking of the polymeric materials. Under the conditions defined in the patent, however, the cross-linkage is not sufficiently high to impart complete infusibility and solvent insolubility to the polymeric materials and it is seen, in Example 4 of the patent for example, that these polymeric materials are still affected by the organic solvents in which they were soluble before cross-linking. Furthermore, it has been found that even in the process of the present invention, polyepoxides such as polymeric diallyl ether monoxide are inefficient as infusibilizing and insolubilizing agents for styrene polymers containing free carboxylic acid groups although they are satisfactory for partial cross-linking of such polymers. The partially cross-linked polymers of French Patent No. 881,981 are very suitable for such uses as the thickening of solutions but they are unsatisfactory for use as protective coatings and for the manufacture of many moulded articles which require high chemical inertness. The present invention provides the means whereby polymers are obtained which are completely thermoset, infusible and solvent insoluble and yet possess a definite intermediate thermoplastic, fusible and solvent soluble stage.

It is therefore an object of this invention to provide new and useful polymeric materials.

Another object of this invention is to provide styrene copolymers having improved properties.

An additional object of this invention is to provide thermoset, infusible, solvent insoluble polymers of styrene having an intermediate thermoplastic, fusible, solvent soluble stage.

A further object of this invention is to provide a method for preparing these polymers.

Other and additional objects of the invention will become apparent hereinafter.

These objects are accomplished by copolymerizing more than 50 parts of styrene with at least 12.5 parts of an acrylic acid and at least 5 parts of at least one other polymerizable ethylenically unsaturated compound having the ethylenic group as sole reactive group, the total parts being 100, and subsequently heating the resultant thermoplastic, fusible, solvent soluble copolymer with linear polymeric 4-vinylcyclohexene diepoxide at a temperature of about 150° C. in the presence of at least 0.5%, by weight of the copolymer, of an amino catalyst.

The details and manner of practising the invention will be apparent by reference to the following specific examples, it being understood that these examples are merely illustrative embodiments of the invention and that the scope of the invention is not limited thereto.

Example 1

10 g. styrene, 0.63 g. methyl acrylate and 1.88 g. acrylic acid were copolymerized in 12.5 g. methyl ethyl ketone and 6.25 g. xylene by heating at 90° C. for 24 hours in the presence of 0.25 g. benzoyl peroxide. There was thus obtained a solution of an 80% styrene-5% methyl acrylate-15% acrylic acid copolymer.

To 10 g. of the above solution, there was added 1.20 g. linear polymeric 4-vinylcyclohexene diepoxide (prepared by polymerization of 4-vinylcyclohexene diepoxide in a butanol solution containing boron trifluoride catalyst) together with 0.020 g. piperidine. A film was cast from this solution which, after heating at 150° C. for one hour, was insoluble in acetone which is a solvent for the initial styrene copolymer.

Complete insolubilization was not obtained by similar treatment of a styrene copolymer containing no methyl acrylate, as shown by the following example.

Example 2

A copolymer containing 85% styrene and 15% acrylic acid was prepared by dissolving 10.62 g. styrene and 1.88 g. acrylic acid in a mixture of 25 g. methyl ethyl ketone and 12.5 g. xylene and heating at 60° C. for sixty hours in the presence of 0.25 g. benzoyl peroxide.

0.6 g. linear polymeric 4-vinylcyclohexene diepoxide (prepared by polymerization of 4-vinylcyclohexene diepoxide in a butanol solution containing boron trifluoride catalyst) was added to 5 g. of the above copolymer solution together with 0.01 g. piperidine and a film was cast therefrom. After heating at 150° C. for one hour, the film was still dissolved by acetone.

The following three examples illustrate the amount of catalyst required for complete insolubilization of the styrene copolymers.

Example 3

8.74 g. styrene, 1.88 g. methyl acrylate and 1.88 g. acrylic acid in 12.5 g. methyl ethyl ketone and 6.25 g. xylene were copolymerized at 60° C. for 60 hours in the presence of 0.25 g. benzoyl peroxide. There was thus obtained a solution of a 70% styrene-15% methyl acrylate-15% acrylic acid copolymer.

To 5 g. of the above copolymer solution, there was added 0.6 g. linear polymeric 4-vinylcyclohexene diepoxide (prepared by polymerization of 4-vinylcyclohexene diepoxide in a butanol solution containing boron trifluoride catalyst) together with 0.001 g. piperidine (0.05% by weight of the copolymer). A film was then cast from this solution which, after heating one hour at 150° C., swelled and softened in acetone, thus showing no difference with a similar film prepared without any piperidine.

Example 4

A result similar to that of Example 3 was obtained by heating at 150° C. for one hour a film cast from a solution containing a 65% styrene-20% methyl acrylate-15% acrylic copolymer, linear polymeric 4-vinylcyclohexene diepoxide and 0.2%, by weight of the copolymer, of piperidine.

Example 5

8.74 g. styrene, 1.88 g. acrylonitrile and 1.88 g. acrylic acid in 12.5 g. methyl ethyl ketone and 6.25 g. xylene were copolymerized at a temperature of 90° C. for 24 hours using 0.25 g. benzoyl peroxide catalyst. There was thus obtained a solution of a copolymer containing 70% styrene-15% acrylonitrile and 15% acrylic acid.

To 5 g. of the above solution, there was added 0.8 g. linear polymeric 4-vinylcyclohexene diepoxide together with 0.01 g. piperidine (0.5% by weight of the copolymer) and a film was cast therefrom on autobody steel panels. After heating at 150° C. for one hour, the film was insoluble in acetone.

Example 6

A copolymer containing 70% styrene, 15% methyl acrylate and 15% methacrylic acid was prepared by dissolving 8.74 g. styrene, 1.88 g. methyl acrylate and 1.88 g. methacrylic acid in 8.34 g. methyl ethyl ketone and 4.16 g. xylene and heating at 90° C. for 24 hours in the presence of 0.25 g. benzoyl peroxide.

0.6 g. linear polymeric 4-vinylcyclohexene diepoxide was added to 5 g. of the above solution together with 0.18 g. piperidine. A film was cast from this solution on autobody steel panels and, after heating at 150° C. for one hour, was insoluble in acetone.

Example 7

7.81 g. styrene, 3.13 g. methyl acrylate and 1.56 g. acrylic acid in 25 g. methyl ethyl ketone and 12.5 g. xylene were heated at 60° C. for sixty hours in the presence of 0.25 g. benzoyl peroxide, thus yielding a copolymer containing 62.5% styrene, 25% methyl acrylate and 12.5% acrylic acid.

To 5 g. of the above copolymer solution, there was added 0.60 g. linear polymeric 4-vinylcyclohexene diepoxide together with 0.02 g. piperidine and a film was cast therefrom. After heating at 150° C. for one hour this film was insoluble in acetone and had an excellent impact flexibility when applied on autobody steel panels.

A similar treatment of copolymers containing less than 12.5% acrylic acid did not yield completely insoluble products.

Example 8

A solution of a 55% styrene-20% methyl acrylate-25% acrylic acid copolymer was prepared by heating at 60° C. for sixty hours a solution comprising 6.87 g. styrene, 2.5 g. methyl acrylate, 3.13 g. acrylic acid, 25 g. methyl ethyl ketone, 12.5 g. xylene and 0.25 g. benzoyl peroxide. To 5 g. of this solution, there were added 0.02 g. piperidine and 0.6 g. linear polymeric 4-vinyl-cyclohexene diepoxide. A film was then cast which, after heating at 150° C. for one hour, was insoluble in acetone.

Example 9

A solution of a copolymer containing 55% styrene, 15% methyl acrylonitrile and 15% acrylic acid was prepared as in Example 5 and 5 g. of the solution were also treated as in Example 5. There was obtained a film which was insoluble in acetone.

The above-detailed examples illustrate certain embodiments of the invention wherein there are completely infusibilized and insolubilized specific styrene copolymers containing specific acrylic acids and specific polymerizable ethylenically unsaturated compounds having the ethylenic group as sole reactive group. The present invention, however, is not restricted to such specific acids and compounds.

The ethylenically unsaturated compounds include any such compounds provided only that they are polymerizable and contain the ethylenic group as sole reactive group. Illustrative compounds which can be used are acrylic, haloacrylic, methacrylic esters and nitriles, such as, for example, acrylonitrile, methyl methacrylate, butyl methacrylate, octyl methacrylate, methoxymethyl methacrylate, chloroethyl methacrylate and the corresponding esters of acrylic and alpha-chloroacrylic acids; vinyl and vinylidene halides, e. g. vinyl chloride, vinyl fluoride, vinylidene chloride, vinylidene fluoride, vinyl carboxylates, e.g. vinyl acetate, vinyl chloroacetate, vinyl propionate and vinyl stearate; vinyl aryls, e. g. vinyl naphthalene; methyl vinyl ketone, etc.

The acrylic acids which can be incorporated into the styrene copolymers include such acids as acrylic acid, haloacrylic acids, methacrylic acid and crotonic acid.

For the preparation of the thermoplastic, fusible, solvent soluble styrene copolymers, any of the well-known processes for the copolymerization of styrene can be used. The previous examples illustrate a solution copolymerization method which is preferable when it is desired to thermoset the copolymers as protective coatings.

For optimum results, the linear polymeric 4-vinylcyclohexene diepoxide should be present in an amount such that there are provided two epoxide groups for each two free carboxylic acid groups of the thermoplastic copolymer to be used in the cross-links.

Although piperidine is the only catalyst used in the foregoing examples, any amino catalyst may be used such as pyridine, piperidine, dimethyl aniline, diethylene triamine, quaternary ammonium compounds, etc., in the proportion of from 0.5% to about 2% by weight of the thermoplastic, fusible, solvent soluble copolymers to be infusibilized and insolubilized.

As shown in the foregoing examples, the infusibilization and insolubilization can be obtained in articles produced from a solution containing a common solvent for and in which the thermoplastic, fusible, solvent soluble copolymer and the linear polymeric 4-vinylcyclohexene diepoxide are compatible. Such solvents include, for example, esters, ketones and mixtures of hydrocarbons with esters and/or ketones. However, the infusibilization and insolubilization can be conducted also on a preformed thermoplastic, fusible, solvent soluble polymeric article.

The invention provides a simple and easily-controlled process for obtaining thermoset, infusible, solvent insoluble polymers of styrene having an intermediate thermoplastic, fusible, solvent soluble stage. The process does not give rise to the formation of undesirable by-products, the thermoset polymeric product finally obtained being free of undesirable substances.

The thermoset, infusible, solvent insoluble styrene polymers of this invention are adapted for a wide variety of uses. For example, they are suitable as adhesives, laminates, protective coatings and for the production of moulded plastic articles and like outlets. Plasticizers, pigments, dyes, reinforcing agents and like materials commonly used in formulating polymeric compositions can be used.

Since it is obvious that many changes and modifications can be made in the above-described details without departing from the nature and spirit of the invention, it is to be understood that the invention is not to be limited thereto except as set forth in the appended claims.

Having thus described our invention what we claim is:

1. A process for the preparation of thermoset, infusible, solvent insoluble polymers of styrene, which comprises heating a thermoplastic, fusible, solvent soluble copolymer of more than 50 parts of styrene and at least 12.5 parts of an acid selected from the group consisting of acrylic acid and methacrylic acid and at least 5 parts of another polymerizable monoethylenically unsaturated compound having the ethylenic group as sole reactive group, the total parts being 100, with linear polymeric 4-vinylcyclohexene diepoxide at a temperature of about 150° C. in the presence of at least 0.5%, by weight of the copolymer, of an amino catalyst, the proportion of polymeric diepoxide to copolymer being such that one epoxide group is present for each free carboxylic acid group of the copolymer.

2. A process for the preparation of thermoset, infusible, solvent insoluble polymers of styrene, which comprises heating a thermoplastic, fusible, solvent soluble copolymer of from 55 to 80 parts of styrene and from 12.5 to 25 parts of an acid selected from the group consisting of acrylic acid and methacrylic acid and from 5 to 30 parts of another polymerizable monoethylenically unsaturated compound having the ethylenic group as sole reactive group, the total parts being 100, with linear polymeric 4-vinylcyclohexene diepoxide at a temperature of about 150° C. in the presence of at least 0.5%, by weight of the copolymer, of an amino catalyst, the proportion of polymeric diepoxide to copolymer being such that one epoxide group is present for each free carboxylic acid group of the copolymer.

3. A process for the preparation of thermoset, infusible, solvent insoluble polymers of styrene, which comprises heating a thermoplastic, fusible, solvent soluble copolymer of from 55 to 80 parts of styrene and from 12.5 to 25 parts of an acid selected from the group consisting of acrylic acid and methacrylic acid and from 5 to 25 parts of methyl acrylate, the total parts being 100, with linear polymeric 4-vinylcyclohexene diepoxide at a temperature of about 150° C. in the presence of at least 0.5%, by weight of the copolymer, of an amino catalyst, the proportion of polymeric diepoxide to copolymer being such that one epoxide group is present for each free carboxylic acid group of the copolymer.

4. A process for the preparation of thermoset, infusible, solvent insoluble polymers of styrene, which comprises heating a thermoplastic, fusible, solvent soluble copolymer of from 55 to 80 parts of styrene and from 12.5 to 25 parts of an acid selected from the group consisting of acrylic acid and methacrylic acid and from 5 to 25 parts of methyl acrylate, the total parts being 100, with linear polymeric 4-vinylcyclohexene diepoxide at a temperature of about 150° C. in the presence of at least 0.5%, by weight of the copolymer, of piperidine, the proportion of polymeric diepoxide to copolymer being such that one epoxide group is present for each free carboxylic acid group of the copolymer.

5. Thermoset, infusible, solvent insoluble polymers of styrene as prepared by the process set forth in claim 1.

GORDON HART SEGALL.
JOHN FRANCIS CLEMOW DIXON.

REFERENCES CITED

The following references are of record in the file of this patent:

UNITED STATES PATENTS

| Number | Name | Date |
|---|---|---|
| 2,131,120 | Schlack | Sept. 27, 1938 |
| 2,527,806 | Foster | Oct. 31, 1950 |
| 2,530,983 | Minter | Nov. 21, 1950 |